United States Patent
Yi

(10) Patent No.: US 9,960,859 B2
(45) Date of Patent: May 1, 2018

(54) ANTI-ELECTROMAGNETIC INTERFERENCE UNIT

(71) Applicant: PEGATRON CORPORATION, Taipei (TW)

(72) Inventor: Young-Ming Yi, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days. days.

(21) Appl. No.: 15/588,709

(22) Filed: May 8, 2017

(65) Prior Publication Data
US 2018/0006735 A1      Jan. 4, 2018

(30) Foreign Application Priority Data

Jul. 1, 2016   (TW) .............................. 105120949 A

(51) Int. Cl.
| | | |
|---|---|---|
| *H04B 1/00* | (2006.01) | |
| *H04B 7/00* | (2006.01) | |
| *H04B 15/00* | (2006.01) | |
| *H04B 5/00* | (2006.01) | |
| *H04W 4/00* | (2018.01) | |

(52) U.S. Cl.
CPC ........... *H04B 15/00* (2013.01); *H04B 5/0025* (2013.01); *H04W 4/008* (2013.01)

(58) Field of Classification Search
CPC ...... H04B 1/0475; H04B 1/38; H04B 1/3833; H04B 1/40; H04B 5/00; H04B 5/0075; H04W 4/008; H04M 1/7253; H04M 2250/04
USPC ............. 455/41.1, 41.2, 552.1, 553.1, 562.1, 455/575.1, 575.5, 575.7, 63.1
See application file for complete search history.

(56) References Cited

U.S. PATENT DOCUMENTS

| | | | | |
|---|---|---|---|---|
| 7,164,933 | B1 * | 1/2007 | Steigerwald | H01Q 1/243 455/575.7 |
| 8,786,507 | B2 * | 7/2014 | Ayatollahi | H01Q 1/38 455/575.1 |
| 8,890,761 | B2 * | 11/2014 | Toyao | H01P 1/2005 343/700 MS |
| 8,934,837 | B2 * | 1/2015 | Zhu | H04B 5/02 455/41.1 |

(Continued)

FOREIGN PATENT DOCUMENTS

| | | |
|---|---|---|
| CN | 204596965 U | 8/2015 |
| TW | I521442 B | 2/2016 |
| TW | M518417 U | 3/2016 |

OTHER PUBLICATIONS

Xing-Jun Wang and Ling-Feng Shi, "Novel Coplanar EBG Low Pass Filter", Progress in Electromagnetics Research Letters, vol. 48, pp. 83-93, 2014.

(Continued)

*Primary Examiner* — Quochien B Vuong
(74) *Attorney, Agent, or Firm* — CKC & Partners Co., Ltd.

(57) ABSTRACT

An anti-electromagnetic interference unit is provided, and the anti-electromagnetic interference unit is used to avoid that electromagnetic interference affects a NFC antenna module. The anti-electromagnetic interference unit comprises a plurality of EBG structures. Each EBG structure comprises a central body and at least one channel. The at least one channel is extended from the body, and extending shape of the at least one channel is a structure with a plurality of meanders.

10 Claims, 4 Drawing Sheets

(56) References Cited

U.S. PATENT DOCUMENTS 9,002,264 B2 * 4/2015 Zhang ................ H04B 5/0031
                                                          455/575.5

OTHER PUBLICATIONS

Kim, K. H. and E. S.-A. Jose, "Analysis and modeling of hybrid planar-type electromagnetic-band gap structures and feasibility study on power distribution network applications", IEEE Transactions on Microwave Theory and Techniques, vol. 56, No. 1, pp. 178-186, 2008.

Satyanarayana Telikepalli et al., "A Simple Technique for Power Distribution With Better Characteristics Than Electromagnetic Bandgap Structures", published in: IEEE Transactions on Components, Packaging and Manufacturing Technology, vol. 5, Issue 6, Jun. 2015, pp. 797-805.

* cited by examiner

ANTI-ELECTROMAGNETIC INTERFERENCE UNIT

RELATED APPLICATIONS

This application claims priority to Taiwan Application Serial Number 105120949, filed Jul. 1, 2016, which is herein incorporated by reference.

BACKGROUND

Technology Field

The present invention relates to an adaptive device and method for anti-electromagnetic interference unit.

Description of Related Art

At present, the wireless communication product becomes thinner. Most communication products have the function of wireless transmission, and the Near Field Communication (NFC) antenna is one of the main elements. For the electromagnetic disturbance (EMI) issue, the NFC antenna is disturbed by electrostatic discharge (ESD) so that the antenna system will fail. Conventionally, to avoid the ESD situation, the antenna radiation body adds capacitors and then connects electrostatic energy to ground. This electrostatic avoidance method radiates frequency multiplication noises of NFC baseband (13.65 MHz), instead, that is needed to add EMI absorber to the NFC antenna or to modify structure of NFC antenna to avoid electrostatic disturbance. However, the EMI absorber will increase the thickness of the NFC antenna, and the structure modification will increase cost and waste time.

SUMMARY

The present invention provides an anti-electromagnetic interference unit connected to a NFC communication antenna module. The anti-electromagnetic interference unit can avoid that the NFC communication antenna module be disturbed by electromagnetic wave. The anti-electromagnetic interference unit is made of one or a plurality of electromagnetic band gap structure. The present invention increases inductance effect or capacitance effect of the electromagnetic band gap structure through changing shape or arrangement of the electromagnetic band gap structure which is connected to the NFC communication antenna module.

An aspect of the disclosure is to provide an anti-electromagnetic interference unit which is connected to a NFC communication antenna module. The anti-electromagnetic interference unit is used to avoid that the NFC communication antenna module be disturbed by electromagnetic wave. The anti-electromagnetic interference unit comprises at least one electromagnetic band gap structure (EBG structure). Each electromagnetic band gap structure comprises a central body and at least one channel. The at least one channel is extended from the central body. The at least one channel is configured on a remaining area which is defined as a coverage of the electromagnetic band gap structure subtracts a coverage of the central body, and an extending shape of each of the at least one channel is a winding structure with a plurality of meanders.

In one embodiment of the present invention, wherein total length of each of the channels is determined through an inductance value corresponded to a needed inductance effect of the anti-electromagnetic interference unit.

In one embodiment of the present invention, a corresponded width of each of the channels is determined through the needed total length of each of the channels on the remaining area defined as the coverage of the electromagnetic band gap structure subtracts the coverage of the central body.

In one embodiment of the present invention, an insulation layer is configured between the anti-electromagnetic interference unit and the NFC communication antenna module, and the insulation layer separates the anti-electromagnetic interference unit and the NFC communication antenna module.

In one embodiment of the present invention, a circuit substrate is configured between the anti-electromagnetic interference unit and the NFC communication antenna module, and the circuit substrate separates the anti-electromagnetic interference unit and the NFC communication antenna module.

In one embodiment of the present invention, each of the electromagnetic band gap structures is a square. An arrangement of the electromagnetic band gap structures is a rectangle. M pieces of the electromagnetic band gap structures are arranged at a first side of the rectangle, and N pieces of the electromagnetic band gap structures are arranged at a second side of the rectangle. M and N are positive integers, and an angle between the first side and the second side is 90 degree.

In one embodiment of the present invention, an arrangement density between each of the electromagnetic band gap structures is determined through a needed capacitance effect of the anti-electromagnetic interference unit.

In one embodiment of the present invention, the central body and the at least one channel are etched from a metal sheet.

In one embodiment of the present invention, the metal sheet is made of copper.

In one embodiment of the present invention, distance between the NFC communication antenna module and the anti-electromagnetic interference unit is smaller than 10 millimeter.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
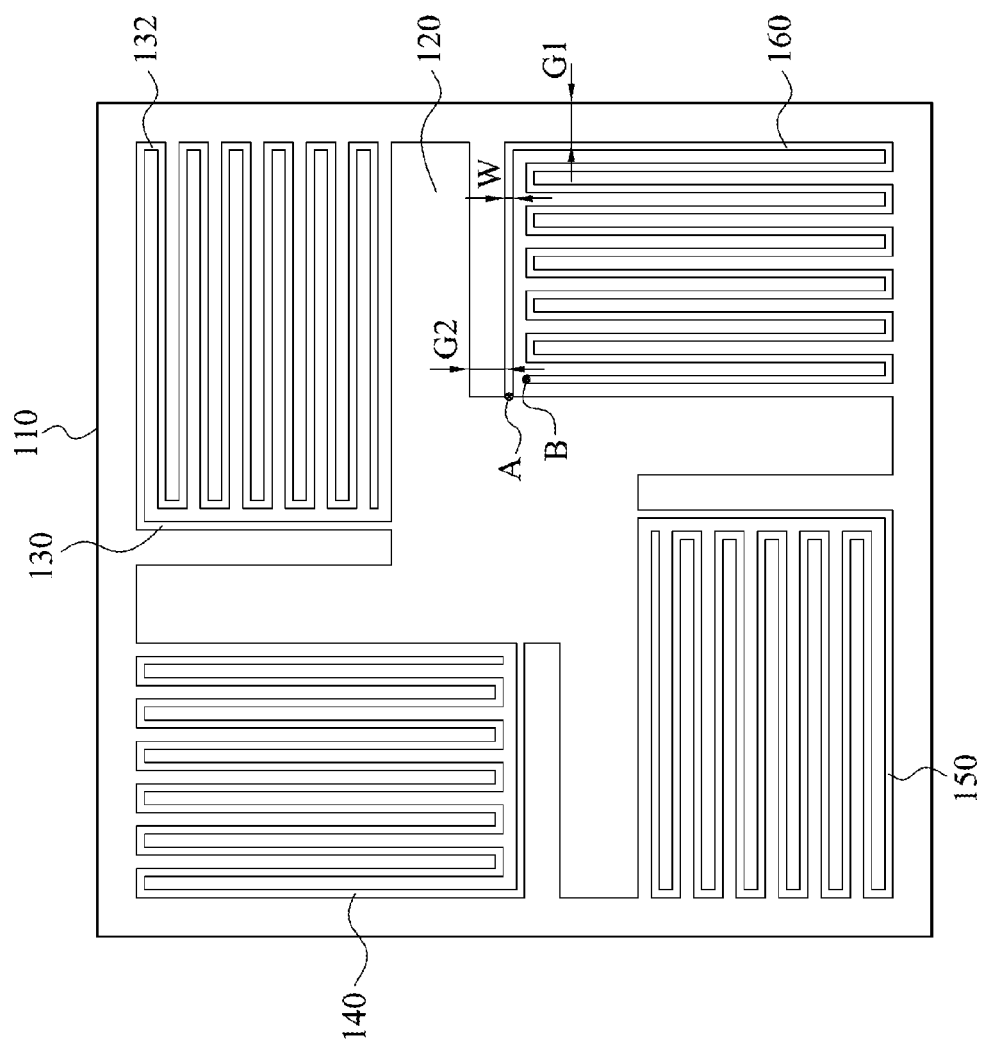
FIG. 1 is a plane structural diagram of an electromagnetic band gap structure of one embodiment of the present invention.

Reference will now be made in detail to the present embodiments of the invention, examples of which are illustrated in the accompanying drawings. Wherever possible, the same reference numbers are used in the drawings and the description to refer to the same or like parts.

One embodiment of the present invention discloses an anti-electromagnetic interference unit connected to a NEC communication antenna module. The NFC communication antenna module and the anti-electromagnetic interference unit can be configured in an electronic device. The anti-electromagnetic interference unit can avoid that the NFC communication antenna module be disturbed by electromagnetic wave. The anti-electromagnetic interference unit comprises at least one electromagnetic band gap structure. FIG. 1 is a plane structural diagram of an electromagnetic band gap structure of one embodiment of the present invention. The electromagnetic band gap structure 110 comprises a central body 120 and four channels 130, 140, 150, and 160. The channel 130, 140, 150, and 160 are extended from the central body 120. The channels 130, 140, 150, and 160 are configured on a remaining area which is defined as coverage of the electromagnetic band gap structure 110 subtracts coverage of the central body 120. The extending shape of channels 130, 140, 150, and 160 is a winding structure with a plurality of meanders. For example, 132 of FIG. 1 is a meander.

The central body 120 and the four channels 130, 140, 150, and 160 of the electromagnetic band gap structure 110 are etched from a metal sheet, and the metal sheet is made of copper.

Generally speaking, the electromagnetic band gap structure is periodic so as to make some bands of the electromagnetic wave cannot pass through the electromagnetic band gap structure. The electromagnetic band gap structure has an obvious forbidden band characteristic. The electromagnetic band gap structure uses obvious forbidden band characteristic to restrain a circuit bypass coupling and improve Q value of the resonance. The obvious forbidden band characteristic can also restrain the antenna effect and improve the antenna gain and bandwidth. The present invention also uses the central frequency of low band gap of the electromagnetic band gap structure to reduce the frequency multiplication radiation of predominant frequency of the NFC communication antenna module.

The band gap central frequency f of the electromagnetic band gap structure is calculated from the following formula (1). In the formula, L is corresponded inductance value of the inductance effect generated by the metal structure shape of the electromagnetic band gap structure, and C is corresponded capacitance value of the capacitance effect generated by the arrangement shape of the plurality of the electromagnetic band gap structures.

$$f = \frac{1}{2\pi\sqrt{LC}} \quad (1)$$

The inductance value L is related to the channel 130, 140, 150, and 160. Therefore, users can determine total length of each of the channels according to the inductance value corresponded to the needed inductance effect of the anti-electromagnetic interference unit. For the calculation range of the channel, for example, the total length of the channel 160 is calculated from the touch point A of the central body to the endpoint B of the metal structure. The channels 130, 140, 150, and 160 are extended from the central body 120. The channels 130, 140, 150, and 160 are configured on a remaining area which is defined as coverage of the electromagnetic band gap structure 110 subtracts coverage of the central body 120. If the width of the channel is smaller, the channel is extended longer. For the channel 160, if the width W is smaller, the channel from point A to point B can have more meanders, the winding times of the channel 160 can be more, and the total length of the channel 160 is longer. In other words, the total length of each of the channels is determined through the inductance value corresponded to the needed inductance effect of the anti-electromagnetic interference unit. Next, a corresponded width of each of the channels is determined through the needed total length of each of the channels on the remaining area defined as the coverage of the electromagnetic band gap structure subtracts the coverage of the central body.

In addition, G1 of FIG. 1 represents a gap between the edge of the channel 160 and the edge of the electromagnetic band gap structure 110. Gaps between the edge of other gaps and the edge of the electromagnetic band gap structure 110 are the same as G1. If G1 is greater, the extending and winding range is smaller, in other words, the channel is shorter. G2 represents the gap between the channel 160 and the central body 120. If G2 is greater, the range of channel extending and winding is smaller, in other words, the channel is shorter.

Conventionally, the bandgap central frequency of the electromagnetic band gap structure should be a high frequency. However, the target of the present invention is restraining the frequency multiplication radiation of predominant frequency of the NFC communication antenna. Accordingly, the bandgap central frequency is needed to reduce, namely, f of the formula (1) is needed to reduce. To reduce bandgap central frequency f, the present invention adjusts the inductance effect or the capacitance effect of the electromagnetic band gap structure to achieve the target.

For the inductance effect, if the inductance value corresponded to the inductance effect is greater, the bandgap central frequency f is lower. However, for the electromagnetic band gap structure 110, if the channel 130, 140, 150, and 160 are longer, the inductance value L corresponded to the inductance effect is greater and the bandgap central frequency f is lower. The length of channel 130, 140, 150, and 160 can be adjusted through changing the width of channel W, G1, and G2. If the width W is smaller, the channel from point A to point B can have more meanders, the winding times of the channel 160 can be more, and the total length of the channel 160 is longer. If G1 is smaller, the channel from point A to point B can have more meanders, the winding times of the channel 160 can be more, and the total length of the channel 160 is longer. If G2 is smaller, the channel from point A to point B can have more meanders, the winding times of the channel 160 can be more, and the total length of the channel 160 is longer. Similarly, the configurations of channel 130, 140, and 150 are the same as the above descriptions.

Figure 2:
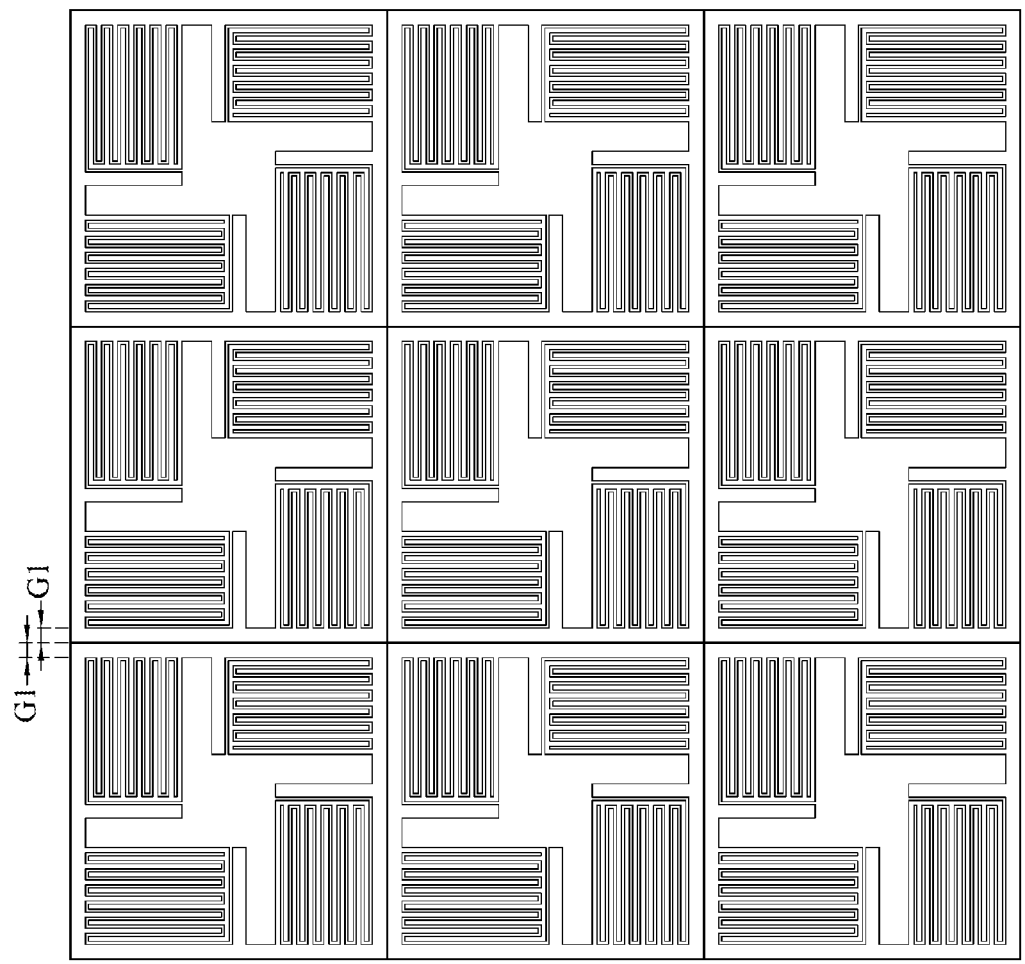
FIG. 2 is a plane structural diagram of 3×3 electromagnetic band gap structures arranging to each other according to the first embodiment of the present invention.

On the other hand, for the capacitance effect, if the anti-electromagnetic interference unit has M×N electromagnetic band gap structures, the distance between two electromagnetic band gap structures affects the capacitance value corresponded to the capacitance effect generated by the arrange shape of the electromagnetic band gap structures. In the present invention, each of the electromagnetic band gap structures is a square. The arrangement of the electromagnetic band gap structures is a rectangle. M pieces of the electromagnetic band gap structures are arranged at a first side of the rectangle, and N pieces of the electromagnetic band gap structures are arranged at a second side of the rectangle. M and N are positive integers, and an angle between the first side and the second side is 90 degree. Referring to FIG. 2, FIG. 2 is a plane structural diagram of 3×3 electromagnetic band gap structures arranging to each other according to the first embodiment of the present invention. In the anti-electromagnetic interference unit 200 of FIG. 2, nine electromagnetic band gap structures are arranged to each other, and three electromagnetic band gap structures are arranged at two sides respectively. If G1 is smaller, the arrangement of the electromagnetic band gap structures is closer so as to generate a greater capacitance value corresponded to the capacitance effect. According to the above formula (1), if the capacitance value is greater, and the bandgap central frequency is lower. Accordingly, through adjusting the capacitance effect generated by the arrangement shape of the 3×3 electromagnetic band gap structures, such as arranging the 3×3 electromagnetic band gap structures to be more closely, the bandgap central frequency f can be reduced.

Figure 3:
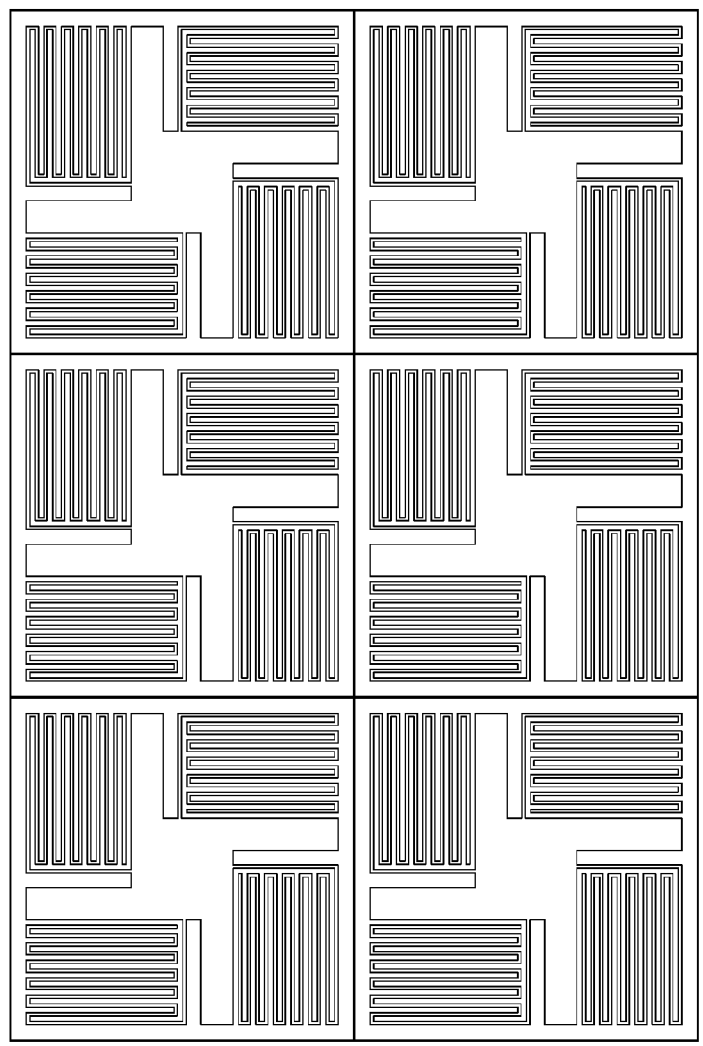
FIG. 3 is a plane structural diagram of 2×3 electromagnetic band gap structures arranging to each other according to the second embodiment of the present invention.

FIG. 3 is a plane structural diagram of 2×3 electromagnetic band gap structures arranging to each other according to the second embodiment of the present invention. In the anti-electromagnetic interference unit 300 of FIG. 3, six electromagnetic band gap structures are arranged to each other. Two electromagnetic band gap structures are arranged in one side, and three electromagnetic band gap structures are arranged in another side. If G1 is smaller, the arrangement of the electromagnetic band gap structure is closer so as to generate the greater capacitance value corresponded to the capacitance effect. Similarly, according to the above formula (1), if the capacitance value is greater, the bandgap central frequency is lower. Therefore, through adjusting the capacitance effect generated by the arrangement shape of the 2×3 electromagnetic band gap structures, such as arranging the 2×3 electromagnetic band gap structures to be more closely, the bandgap central frequency f can be reduced.

Figure 4:
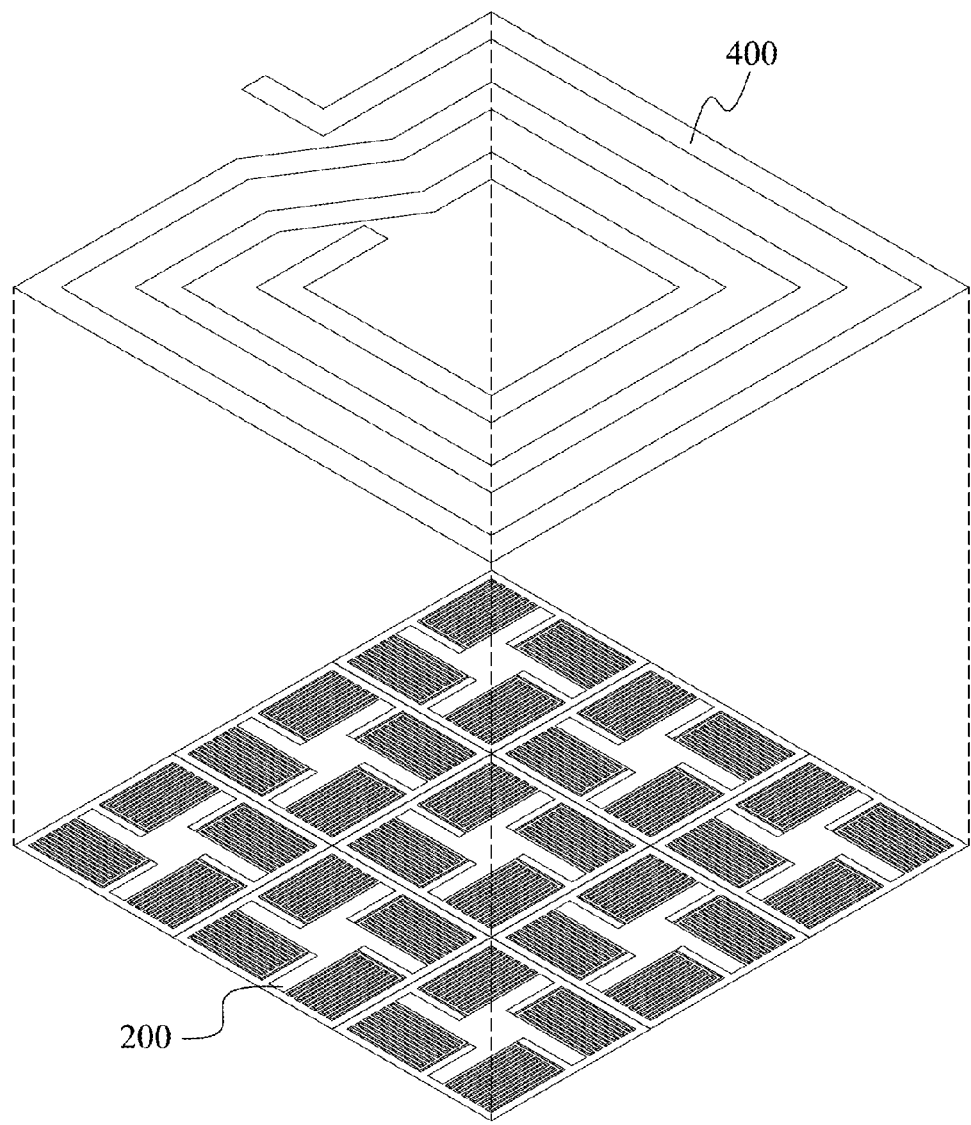
FIG. 4 is a schematic diagram of space configuration between anti-electromagnetic interference unit and NFC antenna module of the present invention.

FIG. 4 is a schematic diagram of space configuration between anti-electromagnetic interference unit 200 and NFC antenna module 400 of the present invention. In one embodiment of the present invention, an insulation layer is configured between the anti-electromagnetic interference unit 200 and the NFC communication antenna module 400, and the insulation layer separates the anti-electromagnetic interference unit 200 and the NFC communication antenna module 400. In another embodiment of the present invention, a circuit substrate is configured between the anti-electromagnetic interference unit 200 and the NFC communication antenna module 400, and the circuit substrate separates the anti-electromagnetic interference unit 200 and the NFC communication antenna module 400. However, no matter what kind of implementation, the distance between the NFC communication antenna module and the anti-electromagnetic interference unit is smaller than 10 millimeter.

The present invention provides an anti-electromagnetic interference unit connected to a NFC communication antenna module. The anti-electromagnetic interference unit can avoid that the NFC communication antenna module be disturbed by electromagnetic wave. The anti-electromagnetic interference unit is made of one or a plurality of electromagnetic band gap structure. The band gap structure is made of metal. The present invention increases inductance effect or capacitance effect of the electromagnetic band gap structure through changing shape or arrangement of the electromagnetic band gap structure which is connected to the NFC communication antenna module. The present invention uses a central frequency of low band gap of the electromagnetic band gap structure so as to reduce the frequency multiplication radiation of predominant frequency of the NFC communication antenna module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An anti-electromagnetic interference unit connected to a NFC communication antenna module and used to avoid that the NFC communication antenna module is disturbed by electromagnetic wave, the anti-electromagnetic interference unit comprising:
    at least one electromagnetic band gap structure, each of the at least one electromagnetic band gap structure comprising:
    a central body; and
    at least one channel, wherein the at least one channel is extended from the central body, the at least one channel is configured on a remaining area which is defined as a coverage of the electromagnetic band gap structure subtracts a coverage of the central body, and an extending shape of each of the at least one channel is a winding structure with a plurality of meanders, wherein total length of each of the channels is determined through an inductance value corresponded to a needed inductance effect of the anti-electromagnetic interference unit.

2. The anti-electromagnetic interference unit of claim 1, a corresponded width of each of the channels is determined through the needed total length of each of the channels on the remaining area defined as the coverage of the electromagnetic band gap structure subtracts the coverage of the central body.

3. The anti-electromagnetic interference unit of claim 1, wherein each of the electromagnetic band gap structures is a square, an arrangement of the electromagnetic band gap structures is a rectangle, M pieces of the electromagnetic band gap structures are arranged at a first side of the rectangle, N pieces of the electromagnetic band gap structures are arranged at a second side of the rectangle, M and N are positive integers, and an angle between the first side and the second side is 90 degree.

4. The anti-electromagnetic interference unit of claim 3, wherein an arrangement density between each of the electromagnetic band gap structures is determined through a needed capacitance effect of the anti-electromagnetic interference unit.

5. The anti-electromagnetic interference unit of claim 1, wherein the central body and the at least one channel are etched from a metal sheet.

6. The anti-electromagnetic interference unit of claim 5, wherein the metal sheet is made of copper.

7. The anti-electromagnetic interference unit of claim 1, wherein distance between the NFC communication antenna module and the anti-electromagnetic interference unit is smaller than 10 millimeter.

8. An electronic device, comprising:
    a NFC communication antenna module; and an anti-electromagnetic interference unit, connected to a NFC communication antenna module and used to avoid that the NFC communication antenna module is disturbed by electromagnetic wave, the anti-electromagnetic interference unit comprising:
at least one electromagnetic band gap structure, each of the at least one electromagnetic band gap structure comprising:
a central body; and
at least one channel, wherein the at least one channel is extended from the central body, the at least one channel is configured on a remaining area which is defined as a coverage of the electromagnetic band gap structure subtracts a coverage of the central body, and an extending shape of each of the at least one channel is a winding structure with a plurality of meanders, wherein total length of each of the channels is determined through an inductance value corresponded to a needed inductance effect of the anti-electromagnetic interference unit.

9. The electronic device of claim 8, wherein an insulation layer is configured between the anti-electromagnetic interference unit and the NFC communication antenna module, and the insulation layer separates the anti-electromagnetic interference unit and the NFC communication antenna module.

10. The electronic device of claim 8, wherein a circuit substrate is configured between the anti-electromagnetic interference unit and the NFC communication antenna module, and the circuit substrate separates the anti-electromagnetic interference unit and the NFC communication antenna module.

* * * * *